United States Patent
Moudgal et al.

(10) Patent No.: US 6,389,517 B1
(45) Date of Patent: May 14, 2002

(54) MAINTAINING SNOOP TRAFFIC THROUGHPUT IN PRESENCE OF AN ATOMIC OPERATION A FIRST PORT FOR A FIRST QUEUE TRACKS CACHE REQUESTS AND A SECOND PORT FOR A SECOND QUEUE SNOOPS THAT HAVE YET TO BE FILTERED

(75) Inventors: Anuradha N. Moudgal, Fremont, CA (US); Belliappa M. Kuttanna, Austin, TX (US); Allan Tzeng, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/513,034

(22) Filed: Feb. 25, 2000

(51) Int. Cl.$^7$ ............................................. G06F 12/00
(52) U.S. Cl. ..................... 711/146; 711/144; 711/131; 711/167; 711/155; 711/168
(58) Field of Search ................................ 711/146, 144, 711/145, 155, 156, 158, 154, 131, 167, 168

(56) References Cited

U.S. PATENT DOCUMENTS

| | | | | |
|---|---|---|---|---|
| 5,163,140 A | * | 11/1992 | Stiles et al. ................. | 711/140 |
| 5,355,467 A | * | 10/1994 | Mac Williams et al. ..... | 711/146 |
| 5,428,761 A | * | 6/1995 | Herlihy et al. ............... | 711/130 |
| 5,706,464 A | * | 1/1998 | Moore et al. ................ | 711/122 |
| 5,923,898 A | * | 7/1999 | Genduso et al. ................ | 710/6 |
| 5,966,729 A | * | 10/1999 | Phelps .......................... | 711/146 |
| 6,073,212 A | * | 6/2000 | Hayes et al. ................. | 711/122 |
| 6,098,156 A | * | 8/2000 | Lenk ............................. | 711/146 |
| 6,145,054 A | * | 11/2000 | Mehrotra et al. ............ | 711/119 |
| 6,182,201 B1 | * | 1/2001 | Arimilli et al. .............. | 711/202 |
| 6,209,067 B1 | * | 3/2001 | Collins et al. ............... | 711/158 |
| 6,237,064 B1 | * | 5/2001 | Kumar et al. ................ | 711/122 |

* cited by examiner

Primary Examiner—Hong Kim
(74) Attorney, Agent, or Firm—Pennie & Edmonds LLP

(57) ABSTRACT

Apparatus and method to permit snoop filtering to occur while an atomic operation is pending. The snoop filtering apparatus includes first and second request queues and a cache. The first request queue tracks cache access requests, while the second request queue tracks snoops that have yet to be filtered. The cache includes a dedicated port for each request queue. The first port is dedicated to the first request queue and is a data-and-tag read-write port, permitting modification of both a cache line's data and tag. In contrast, the second port is dedicated to the second request queue and is a tag-only port. Because the second port is a tag-only port, snoop filtering can continue while a cache line is locked without fear of any modification of the data associated with the atomic address.

11 Claims, 9 Drawing Sheets

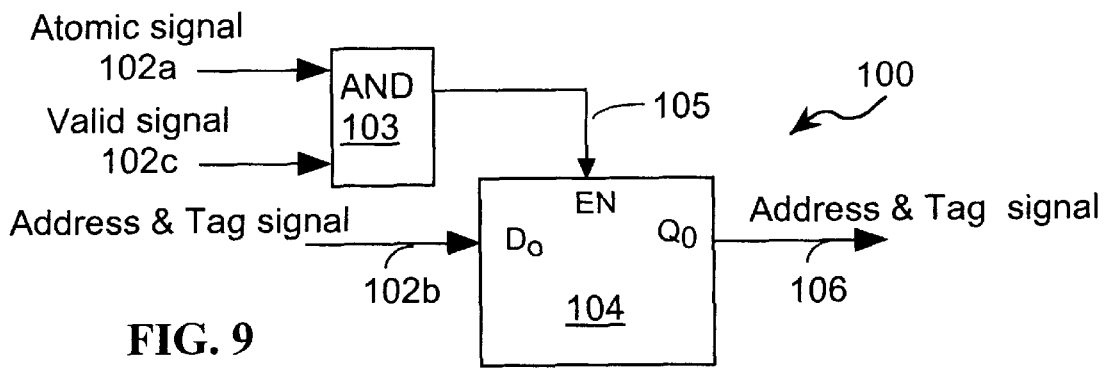
FIG. 8
FIG. 9
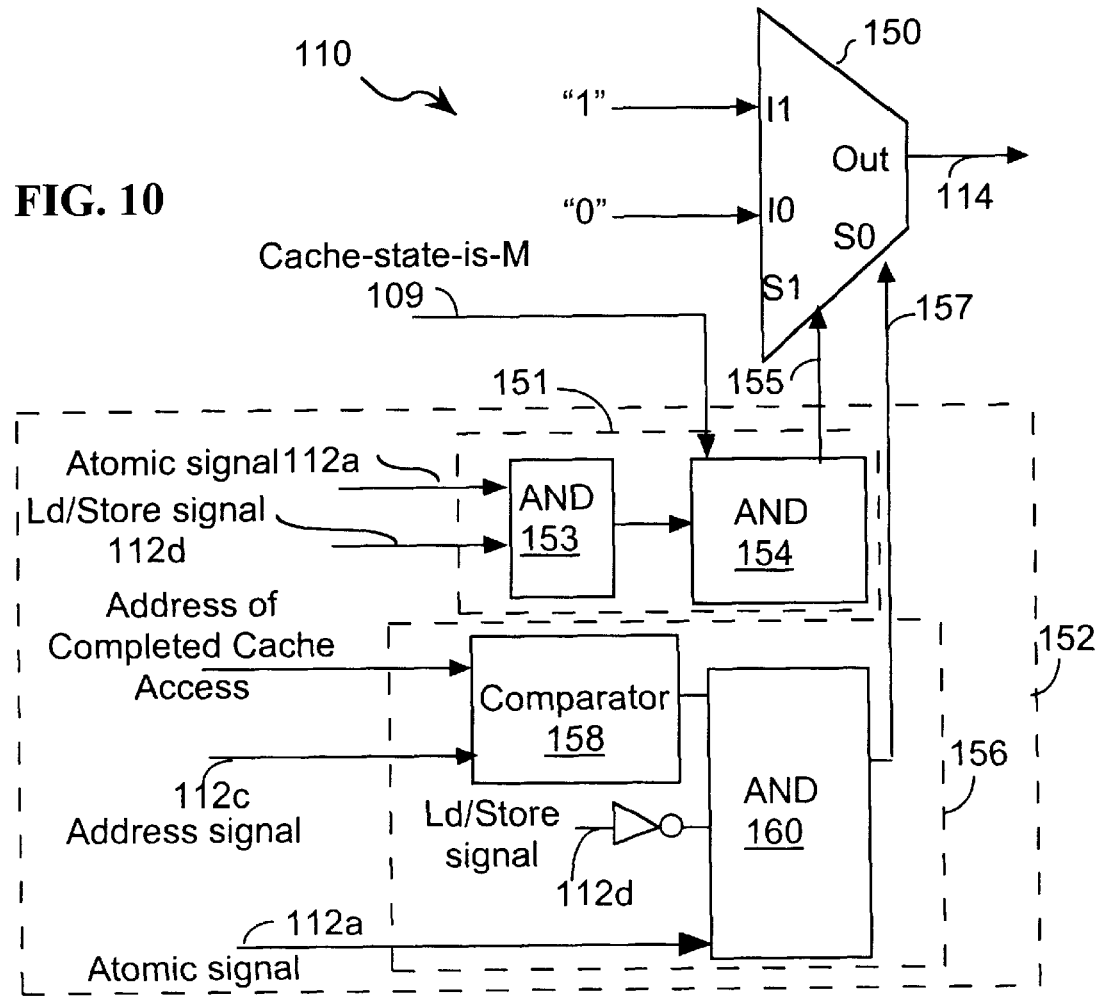
FIG. 10

MAINTAINING SNOOP TRAFFIC THROUGHPUT IN PRESENCE OF AN ATOMIC OPERATION A FIRST PORT FOR A FIRST QUEUE TRACKS CACHE REQUESTS AND A SECOND PORT FOR A SECOND QUEUE SNOOPS THAT HAVE YET TO BE FILTERED

CROSS REFERENCE TO RELATED APPLICATIONS

The present application is related to co-pending U.S. non-provisional patent application No. 09/513033, filed Feb. 25, 2000, entitled "Apparatus and Method for Preventing Cache Data Eviction During an Atomic Operation".

BRIEF DESCRIPTION

The present invention relates generally to snoop filtering, and particularly to an apparatus and method for snoop filtering during an atomic operation.

BACKGROUND

FIG. 1 illustrates, in block diagram form, a typical prior art multi-processor System 30. System 30 includes a number of Processors, 32a, 32b, 32c, coupled via a shared Bus 35 to Main Memory 36. Each Processor 32 has its own non-blocking Cache 34, which is N-way set associative. Each cache index includes data and a tag to identify the memory address with which the data is associated. Additionally, coherency bits are associated with each item of data in the cache to indicate the cache coherency state of the data entry. According to the MOSI cache coherency protocol, each cache data entry can be in one of four states: M, O, S, or I. The I state indicates invalid data. The owned state, O, indicates that the data associated with a cache index is valid, has been modified from the version in memory, is owned by a particular cache and that another cache may have a shared copy of the data. The processor with a requested line in the O state responds with data upon request from other processors. The shared state, S, indicates that the data associated with a cache index is valid, and one or more other processors share a copy of the data. The modified state, M, indicates valid data that has been modified since it was read into cache and that no other processor has a copy of the data.

Cache coherency states help determine whether a cache access request is a miss or a hit. A cache hit occurs when one of the ways of a cache index includes a tag matching that of the requested address and the cache coherency state for that way does not indicate invalid data. A cache miss occurs when none of the tags of an index set matches that of the requested address or when the way with a matching tag contains invalid data. FIG. 2 illustrates how MOSI cache coherency states transition in response to various types of misses. The events causing transitions between MOSI states are indicated using the acronyms IST, ILD, FST and FLD. As used herein, "ILD" indicates an Internal LoaD; i.e., a load request from the processor associated with the cache. Similarly, IST indicates an Internal STore. "FLD" indicates that a Foreign LoaD caused the transition; i.e, a load request to the cache coming from a processor not associated with cache, and "FST" indicates a Foreign STore.

"Snooping" refers to the process by which a processor in a multi-processor system determines whether a foreign cache stores a desired item of data. As used herein, a snoop represents a potential, future request for an eviction, e.g., a FLD or a FST, on a particular address. Each snoop indicates the desired address and operation. Every snoop is broadcast to every Processor 32 within System 30, but only one Processor 32 responds to each snoop. The responding Processor 32 is the one associated with the Cache 34 storing the data associated with the desired address. Each Processor 32 within System 30 includes an External Interface Unit (EIU), which handles snoop responses.

FIG. 3 illustrates, in block diagram form, EIU 40 and its coupling to Bus 35 and Cache 34. EIU 40 receives snoops from Bus 35. EIU 40 forwards each snoop onto Cache Controller 42, which stores the snoop in Request Queue 46 until it can be filtered. Snoop filtering involves determining whether a snoop hits or misses in Cache 34 and indicating that to EIU 40. Given the architecture of FIG. 3, the latency between receipt of a snoop by EIU 40 and a response to it can be quite long under the best of circumstances. Snoop latency usually increases from its theoretical minimum in response to other pending cache access requests, such as a pending atomic operation, for example. An atomic operation refers to a computational task that should be completed without interruption. Processors 32 typically implement atomic operations as two sub-operations on a single address, one sub-operation on the address following the other without interruption. One atomic operation, for example, is an atomic load, which is a load followed immediately and without interruption by a store to the same address. To protect the data associated with an atomic operation during the pendency of the atomic operation, some processors cease filtering snoops, even though most snoops are for addresses other than that associated with the pending atomic operation. Two factors necessitate this approach. First, Cache includes a single data-and-tag read-write port, which, in response to a hit permits modification of both a cache line's data and tag. Second, most processors respond to a snoop hit by immediately beginning data eviction. This is unacceptable during an atomic operation, therefore all access to Cache 37 is halted during the pendency of the atomic operation. However, the pendency of the atomic operation may so long that EIU 40 is forced to back throttle snoops. Other operations may also cause a processor to cease snoop filtering without regard to the addresses to be snooped. Thus, a need exists for an improved apparatus and method for filtering snoops independent of other pending cache access requests.

SUMMARY

The apparatus of the present invention permits snoop filtering to continue while an atomic operation is being executed. The snoop filtering apparatus includes first and second request queues and a cache. The first request queue tracks cache access requests, while the second request queue tracks snoops that have yet to be filtered. The cache includes a dedicated port for each request queue. The first port is dedicated to the first request queue and is a data-and-tag port, permitting modification of cache contents. In contrast, the second port is dedicated to the second request queue and is a tag-only port. Because the second port is a tag-only port, snoop filtering can continue during an atomic operation without fear of any modification of the data associated with the atomic address.

BRIEF DESCRIPTION OF THE DRAWINGS

Additional features of the invention will be more readily apparent from the following detailed description and appended claims when taken in conjunction with the drawings, in which:

FIG. 8 illustrates an entry of the Atomic Address Register utilized in accordance with an embodiment of the invention.

FIG. 9 is a block diagram of the Address Write Circuitry of the Control Circuitry of FIG. 7.

FIG. 10 is a block diagram of the Lock Bit Control Circuitry of the Control Circuitry of FIG. 7.

DETAILED DESCRIPTION

A. Snoop Filtering Circuitry Overview

Figure 1:
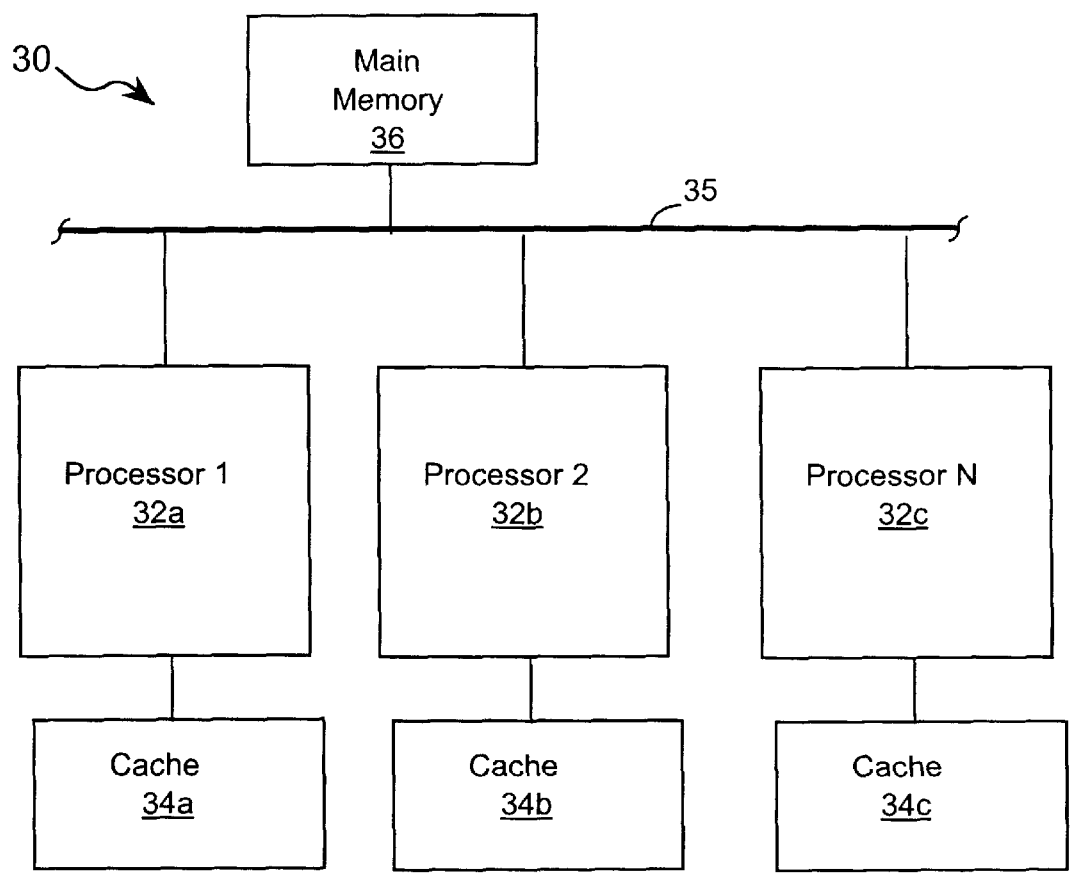
FIG. 1 illustrates a prior art multi-processor system.
Figure 2:
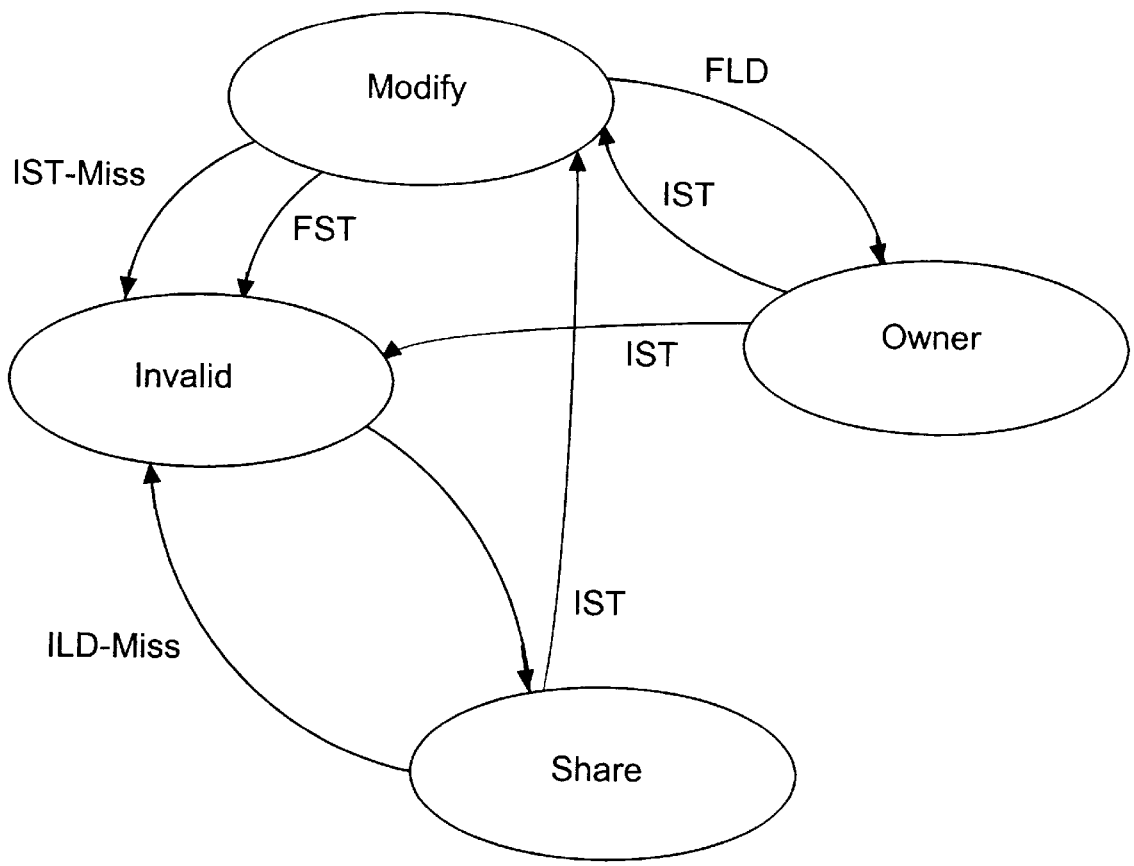
FIG. 2 illustrates the states of the prior art MOSI cache coherency protocol.
Figure 3:
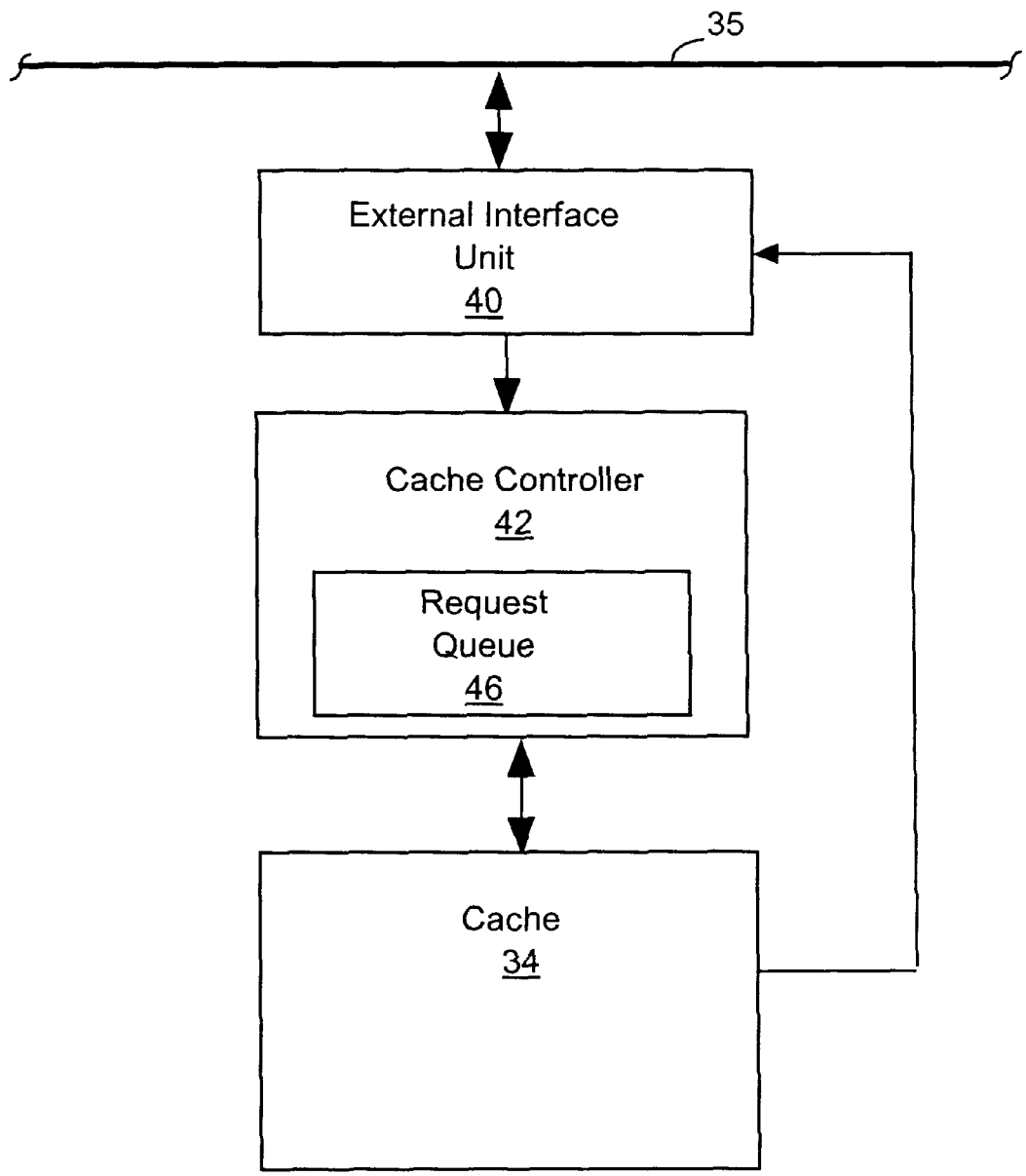
FIG. 3 illustrates a prior art External Interface Unit and it relationship with a cache.
Figure 4:
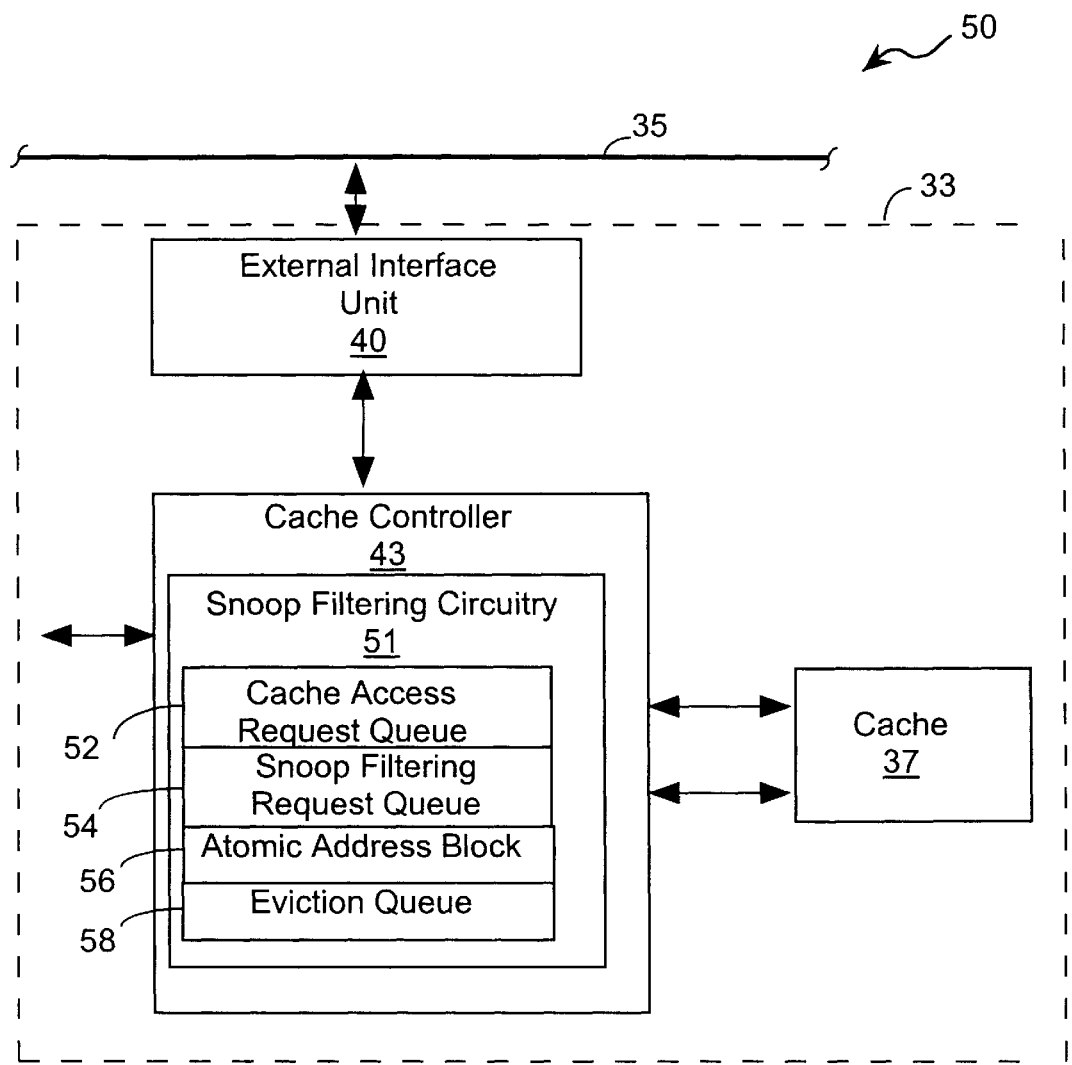
FIG. 4 illustrates Snoop Filtering Circuitry in accordance with an embodiment of the invention.

FIG. 4 illustrates in block diagram form a portion of a Processor 33 of a multi-processor system 50. Processor 33 improves snoop latency by continuing to filter snoops during the pendency of an atomic operation. Processor 33 achieves this improvement using Cache 37, Cache Access Request Queue 52 and Snoop Filtering Request Queue 54. Cache Controller 43 uses Cache Access Request Queue 52 to track native, or internal, cache access requests and Snoop Filtering Request Queue 54 to filter snoops. In each clock cycle, even during the execution of an atomic operation, both Cache Access Request Queue 52 and Snoop Filtering Request Queue 54 couple a request to a dedicated port of Cache 37. Because the port dedicated to Snoop Filtering Request Queue 54 is a read-only port, filtering of snoops can continue during an atomic operation without danger of modification of the data associated with the address upon which the atomic operation is being performed ("the atomic address") via the read-write port. When a snoop hits, Cache 37 informs External Interface Unit 40 so that it can issue an eviction request to Eviction Queue 58. Additionally, Processor 33 includes Atomic Address Block 56, which protects the atomic address from eviction during the atomic operation. Atomic Address Block 56 detects, the beginning of an atomic operation by monitoring cache access requests from the Cache Access Request Queue 52. Atomic Address Block 56 then monitors the Eviction Queue 58 to detect when eviction of the atomic address is requested. Atomic Address Block 56 prevents eviction of the atomic address by asserting a Stall signal, which causes Cache Controller 43 to stall selection of eviction requests from Eviction Queue 58.

B. Queues of the Snoop Filtering Circuitry

Figure 5:
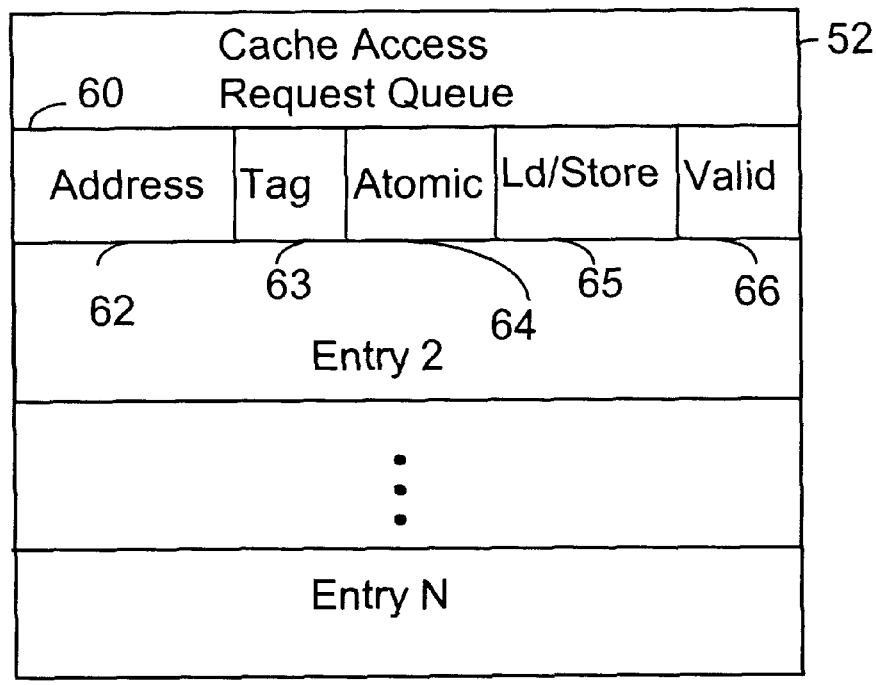
FIG. 5 illustrates a Cache Access Request Queue of the Snoop Filtering Circuitry of FIG. 4.

Cache Access Request Queue 52 is preferably realized as a memory device storing an entry for each outstanding request for access to Cache 37. FIG. 5 illustrates an entry 60 of Cache Access Request Queue 52. The maximum number of entries Cache Access Request Queue 52 can support is a design choice. Entry 60 contains information about a single outstanding cache access request, and includes Address bits 62, Tag bits 63, Atomic bit 64, Ld/Store bit 65 and Valid bit 66. Address bits 62 and Tag bits 63 indicate the memory address to which the request seeks access. Atomic bit 64 indicates whether or not the cache access request is a sub-operation of an atomic operation. Ld/Store bit 65 indicates whether the cache access request is for a load or store operation. Valid bit 66 indicates whether or not the associated entry is valid. Cache Controller 43 controls the contents of Cache Access Request Queue 52.

Figure 6:
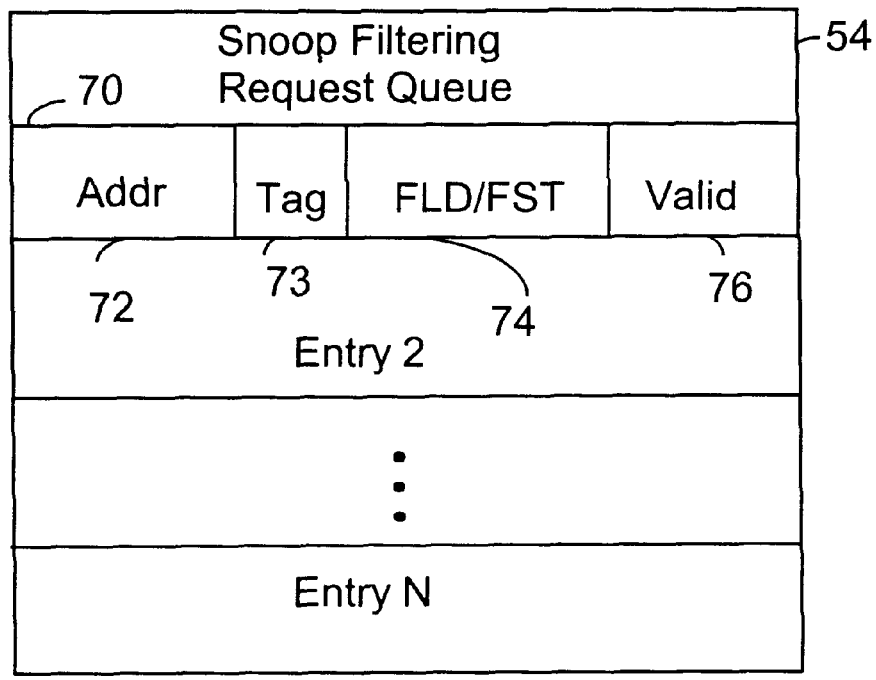
FIG. 6 illustrates a Snoop Filtering Request Queue of the Snoop Filtering Circuitry of FIG. 4.

Cache Controller 43 also controls the contents of Snoop Filtering Request Queue 54. Preferably, Snoop Filtering Request Queue 54 is realized as a memory device storing an entry for each outstanding snoop. FIG. 6 illustrates an entry 70 of Snoop Filtering Request Queue 54. The maximum number of entries Request Queue 54 can support is a design choice. Entry 70 contains information about a single outstanding snoop, and includes Address bits 72, Tag bits 73, FLD/FST bit 74, and Valid bit 76. Address bits 72 and Tag bits 73 indicate the memory address to which the snoop seeks access. FLD/FST bit 74 indicates whether the snoop is associated with a foreign load or a foreign store. Valid bit 76 indicates whether or not the associated entry is valid.

Figure 11:
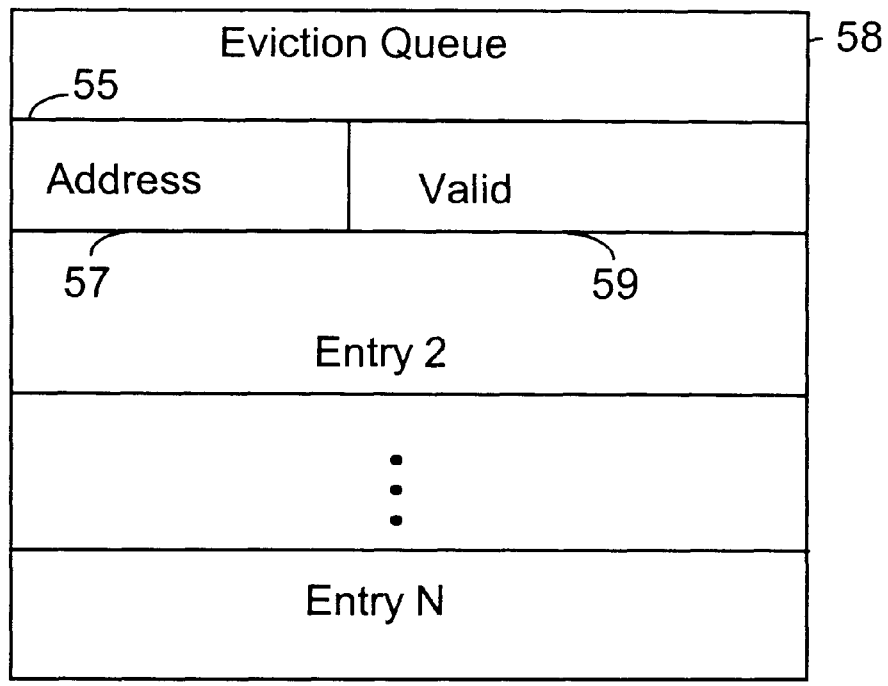
FIG. 11 illustrates a Eviction Queue of the Snoop Filtering Circuitry of FIG. 4.

FIG. 11 illustrates an entry 55 of Eviction Queue 58. The maximum number of entries Eviction Queue 58 can support is a design choice. Entry 55 contains information about a single outstanding eviction request and includes Address bits 57 and Valid bit 59. Address bits 57 indicates the memory address on which the eviction will be performed. Valid bit 59 indicated whether or not the associated entry is valid. Cache Controller 43 stalls servicing of Eviction Queue 58 in response to a Stall signal from Snoop Filtering Circuitry 51.

C. The Atomic Address Block

Figure 7:
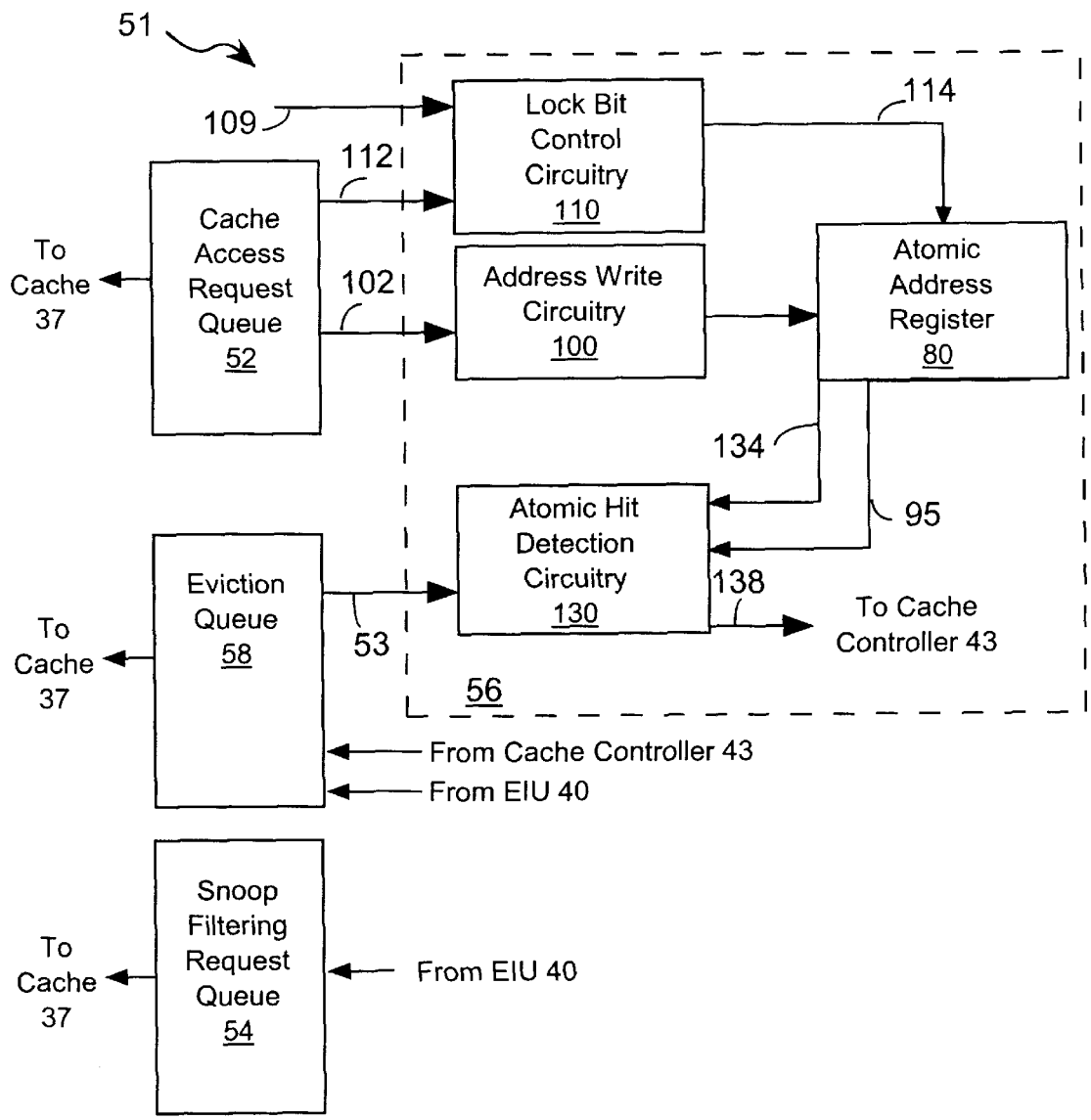
FIG. 7 is a block diagram of the Atomic Address Register and the Control Circuitry of the Snoop Filtering Circuitry of FIG. 4.

FIG. 7 illustrates, in block diagram form, Atomic Address Block 56 and its coupling to Cache Access Request Queue 52, Snoop Filtering Request Queue 54 and Eviction Queue 58. Atomic Address Block 56 includes Atomic Address Register 80, Address Write Circuitry 100, Lock Bit Control Circuitry 110 and Atomic Hit Detection Circuitry 130. Address Write Circuitry 100 and Lock Bit Control Circuitry 110 monitor the cache access requests coupled to Cache 37 by Cache Access Request Queue 52. When a cache access request involves the first operation of an atomic operation, Address Write Circuitry 100 stores the atomic address in Atomic Address Register 80. Lock Bit Control Circuitry 110 responds to the same circumstances by locking the atomic address to prevent access to the data during the pendency of the atomic operation. During the pendency of the atomic operation Atomic Hit Detection Circuitry 130 monitors eviction requests from Eviction Queue 58. During an atomic operation servicing of eviction requests is permitted except for eviction requests for the atomic address. When a eviction request hits to the atomic address during an atomic operation, Atomic Hit Detection Circuitry 130 asserts its Stall signal, causing Cache Controller 43 to cease servicing Eviction Queue 58.

Atomic Address Register 80 is preferably realized as a memory device storing an entry 90 for each atomic operation which Processor 33 allows to be simultaneously pending. In a preferred embodiment, Processor 33 permits just one atomic operation to be pending at a time. FIG. 8 illustrates an entry 90 of Atomic Address Register 80. Entry 90 includes Address & Tag bits 92, and Lock bit 94. Address & Tag bits 92 identify the location within Cache 37 for which an atomic operation is currently pending. Lock bit 94 indicates whether the atomic address may be accessed. Lock bit 94 is asserted when a cache access request associated with the first sub-operation of an atomic operation is coupled from Cache Access Request Queue 52 to Cache 37. Lock bit 94 is deasserted upon completion of the second sub-operation of the atomic operation. Thus, Lock bit 94 also indicates the validity of the contents of Atomic Address Register 80.

Referring once more to FIG. 7, Lock Bit Control Circuitry 110 controls the state of Lock bit 94 of Atomic Address Register 80. Lock Bit Control Circuitry 110 monitors the signals coupled to Cache 37 on lines 112 by Cache Access Request Queue 52. The signals on lines 112 represent a single entry 60 of Cache Access Request Queue 52. If the signals on lines 112 indicate that the cache access request represents the first sub-operation of an atomic operation, then Lock Bit Control Circuitry 110 modifies Lock bit 94 to indicate that the atomic address is unavailable. On the other hand, if the signals on lines 112 indicate that the cache access request represents completion of the second sub-operation of the atomic operation, then Lock Bit Control Circuitry modifies Lock bit 94 to indicate that the atomic address is available; i.e, that Entry 90 is no longer valid.

Atomic Hit Detection Circuitry 130 protects data associated with an atomic address from eviction during the atomic operation. Atomic Hit Detection Circuitry 130 identifies an eviction request for the atomic address by comparing the atomic address stored within Atomic Address Register 80 to the signals on line 53, which represent the Address bits 57 of a single entry 55 of Eviction Queue 58. (See FIG. 11) If the two addresses match while the atomic address is locked, then Atomic Hit Detection Circuitry 130 asserts it Stall signal, which is coupled to Cache Controller 43 on line 138. Cache Controller 43 responds to assertion of the Stall signal by stalling selection of eviction requests in Eviction Queue 58. Cache Controller 43 resumes servicing of eviction requests when the Stall signal is deasserted. Atomic Hit Detection Circuitry 130 de-asserts the Stall signal when the atomic operation is completed.

D. Address Write Circuitry

FIG. 9 illustrates Address Write Circuitry 100 in block diagram form. Address Write Circuitry 100 is preferably realized as a series of parallel Latches 104, each with an associated logical AND gate 103, although only one of each is illustrated. Each Latch 104 stores a single bit of an address and tag pair. The D input of each Latch 104 is coupled to a line of lines 102b, which represents a bit of the Address and Tag bits of Cache Access Request Queue 52. The enable input of Latch 104 is controlled by the output of a logical AND gate 103. Logical AND gate 103 enables Latch 104 whenever the current cache access request from Cache Access Request Queue 52 represents a valid request for an atomic operation. In other words, logical AND gate 103 brings its output active whenever the signals on line 102c representing the Valid bit 66 and the signals on line 102a representing Atomic bit 64 are active. (See FIG. 5) Thus, when the signals on lines 102a and 102c indicate a valid request for an atomic operation is being serviced, then the signals on lines 102b are latched by Latches 104.

E. Lock Bit Control Circuitry

FIG. 10 illustrates Lock Bit Control Circuitry 110 in block diagram form. Lock Bit Control Circuitry 110 includes logical multiplexer (MUX) 150 and Select Control Circuitry 152. The output of MUX 150 on line 114 determines the state of the Lock bit 94 to be written in Atomic Address Register 80. When input I1 is selected, MUX 150 indicates that the Lock bit 94 should be locked. On the other hand, when input I0 is selected, MUX 150 drives the signal on line 114 that the Lock bit 94 should be unlocked. Select Control Circuitry 152 selects between the I1 and I0 inputs using First Select Control Circuit 151 and Zero Select Control Circuitry 156. First Select Control Circuit 151 controls when the I1 input is selected by controlling the S1 signal on line 155. First Select Control Circuit 151 is realized as a pair of logical AND gates 153 and 154. Logical AND gate 153 asserts its output signal when its input signals on lines 112a and 112d indicate that the cache access request being serviced represents the first sub-operation of an atomic operation. Logical AND gate 154 asserts its output, the S1 signal, when the cache coherency state of the atomic address is M and the current operation is the first sub-operation of a atomic operation. Otherwise, First Select Control Circuit 154 de-asserts the S1 signal. Zero Select Control Circuitry 156 controls when the I0 input of MUX 150 is selected by controlling the S0 signal on line 157. Zero Select Control Circuitry 156 includes one Zero Select Circuit 156a for each entry of Cache Access Request Queue 52. FIG. 10 illustrates a single instance of a Zero Select Control Circuit 156a. When a cache access is completed, Zero Select Circuit 156a examines its associated entry to determine whether the associated cache access request just completed. Comparator 158 performs this task. If the addresses match and the cache access request entry is associated with the second sub-operation of an atomic operation, as represented by signals representing the Atomic bit 64 and Ld/Store bit 65 of the cache access request entry 60, then logical AND 160 asserts the S0 signal on line 157, thereby unlocking the Lock bit 94 of Atomic Address Register 80.

F. Atomic Hit Detection Circuitry

Figure 12:
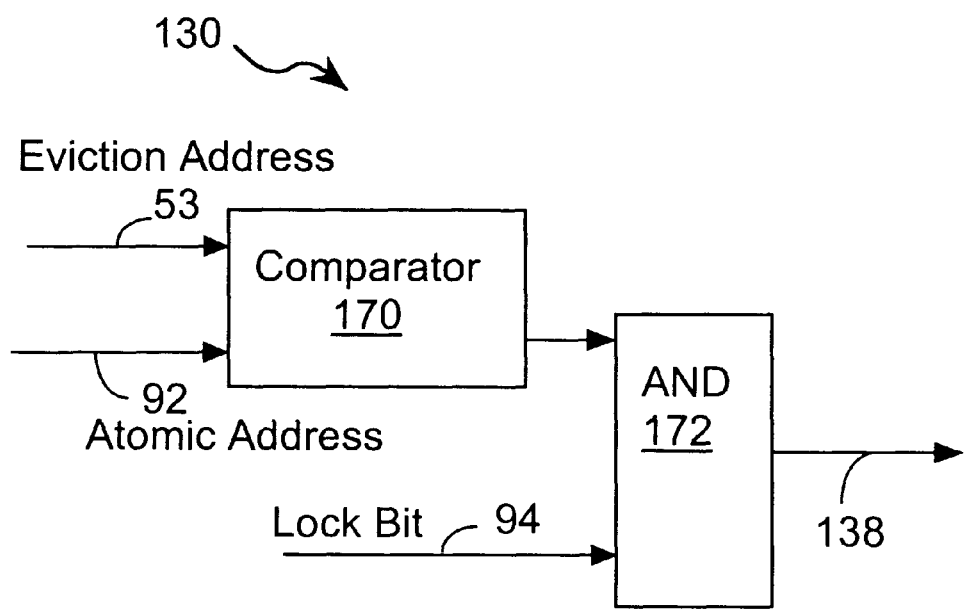
FIG. 12 is a block diagram of the Atomic Hit Detection Circuitry of the Control Circuitry of FIG. 7.

FIG. 12 illustrates Atomic Hit Detection Circuitry 130 in block diagram form. Atomic Hit Detection Circuitry 130 signals an eviction request cache hit to Cache Controller 43 via the Stall signal on line 138. Atomic Hit Detection Circuitry 130 includes Comparator 170 and logical AND gate 172. Comparator 170 compares the address of the eviction request, which is represented by the signals on line 53, with the atomic address, which is represented by signals on line 92. Just because the eviction address and the atomic address match does not necessarily mean that Eviction Queue 58 should be stalled. Eviction should be stalled only if the atomic operation is still pending. Logical AND gate 172 determines whether this is the case by asserting its output, the Stall signal on line 138, only if the Lock bit 94 is asserted.

G. Illustration of a method of filtering snoops without stalling access to a cache of a processor implementing an atomic operation.

Figure 13:
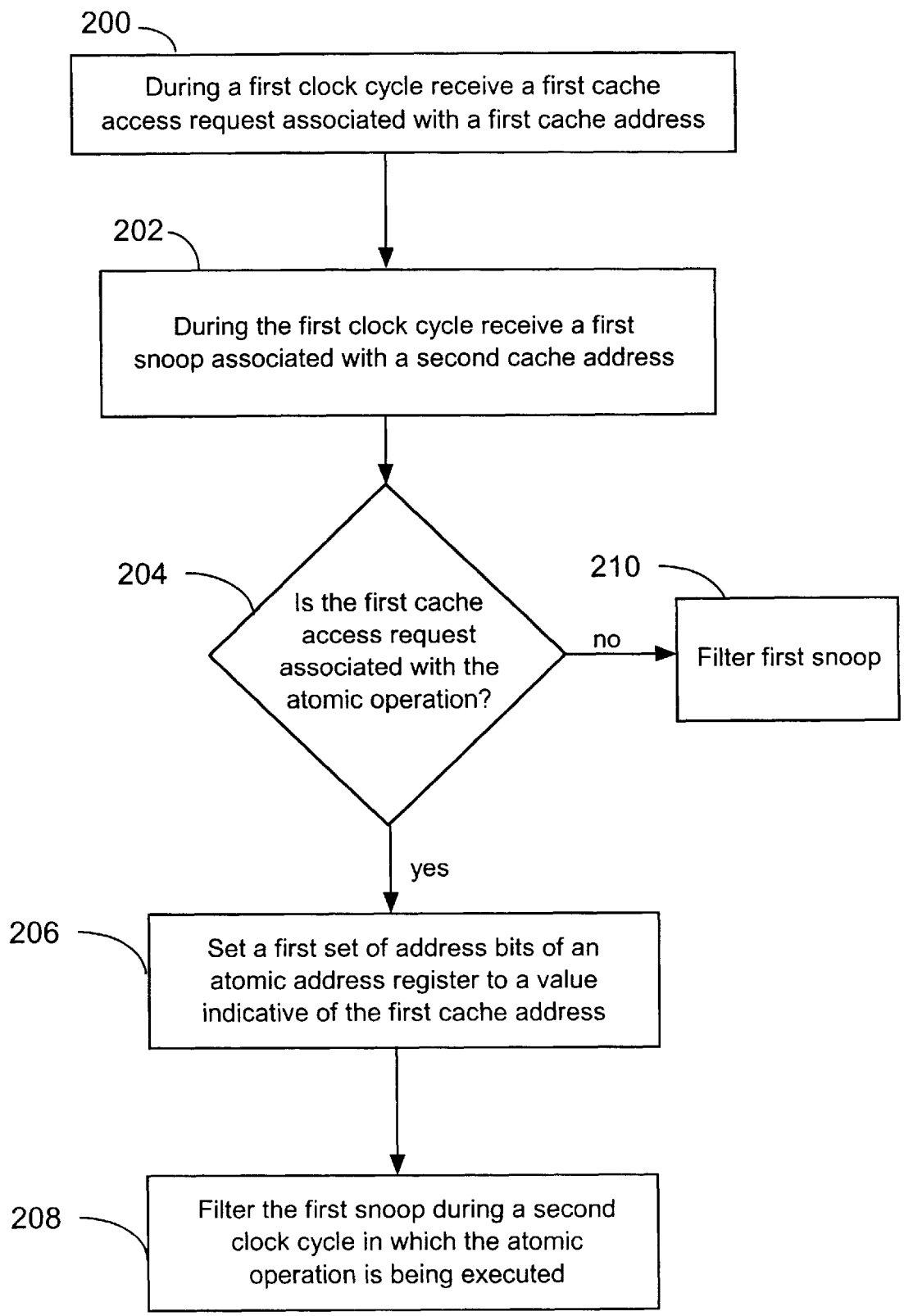
FIG. 13 illustrates a method of filtering snoops without stalling access to a cache of a processor implementing an atomic operation.

FIG. 13 illustrates a method of filtering snoops without stalling access to a cache of a processor implementing an atomic operation. The method is carried out in a series of steps, the first of which is during a first clock cycle receiving a first cache access request associated with a first cache address (step 200). Also during the first clock cycle receiving a first snoop associated with a second cache address (step 202). If the first cache access request is associated with the atomic operation (step 204), setting a first set of address bits of an atomic address register to a value indicative of the first cache address (step 206). Further, during a second clock cycle in which the atomic operation is being executed, filtering the first snoop (step 208). If the first cache access request is not part of an atomic operation (204-No), the first snoop is filtered (step 210).

ALTERNATE EMBODIMENTS

While the present invention has been described with reference to protecting an atomic address while an atomic address is pending, the description is illustrative of the invention and is not to be construed as limiting the invention. For example, the present invention may be modified to protect an address that is desired to be locked. Various modifications may occur to those skilled in the art without departing from the true spirit and scope of the invention as defined by the appended claims.

What is claimed is:

1. An apparatus for filtering snoops without stalling during an atomic operation, the apparatus comprising:

a first request queue storing an entry for each cache access request, each entry of the first request queue including a first set of address bits and an atomic bit, the first set of address bits indicating a first cache address associated with the cache access request, the atomic bit indication whether the cache access request is associated with the atomic operation;

a second request queue storing an entry for each snoop to be filtered, each entry of the second request queue including a second set of address bits, the second set of address bits indicating a second cache address associated with the snoop;

a cache with a first port and a second port, the first port being a data-and-tag port dedicated to the first request queue and the second port being a tag-only port dedicated to the second request queue, the cache permitting simultaneous access by the first and the second port to a same address during a same clock cycle.

2. The apparatus of claim 1 wherein the first port of the cache is a read-write port.

3. The apparatus of claim 1 wherein the second port of the cache is a read-write port.

4. The apparatus of claim 1, including an atomic address register for storing the first set of address bits from an entry of the first request queue corresponding to a cache access request when the atomic bit of the entry indicates that the cache access request is associated with the atomic operation.

5. A method of filtering snoops without stalling access to a cache of a processor implementing an atomic operation, the method comprising:

during a first clock cycle receiving a first cache access request associated with a first cache address and a first snoop associated with a second cache address;

determining whether the first cache access request is associated with the atomic operation;

if the first cache access request is associated with the atomic operation setting a first set of address bits of an atomic address register to a value indicative of the first cache address; and filtering the first snoop during a second clock cycle in which the atomic operation is being executed.

6. The method of claim 5 wherein the second cache address of the first snoop is the same as the first cache address.

7. The method of claim 5 including storing the first cache access request as an entry in a first request queue;

storing the first snoop as an entry in a second cache request queue;

wherein the first request queue is coupled to a first port of the cache and the second request queue is coupled to a distinct, second port of the cache.

8. The method of claim 7, wherein each entry of the first request queue represents a respective cache access request and includes a first set of address bits and an atomic bit, the first set of address bits indicating a first cache address associated with the respective cache access request, the atomic bit indication whether the respective cache access request is associated with the atomic operation.

9. The method of claim 8, wherein each entry of the second request queue represents a respective snoop and includes a second set of address bits, the second set of address bits indicating a second cache address associated with the respective snoop.

10. The method of claim 9, wherein the first port is a data-and-tag port dedicated to the first request queue and the second port is a tag-only port dedicated to the second request queue, the method including permitting simultaneous access by the first and the second port to a same address during a same clock cycle.

11. The method of claim 7, wherein the first port is a data-and-tag port dedicated to the first request queue and the second port is a tag-only port dedicated to the second request queue, the method including permitting simultaneous access by the first and the second port to a same address during a same clock cycle.

* * * * *